United States Patent
Lin

(10) Patent No.: US 7,252,035 B2
(45) Date of Patent: Aug. 7, 2007

(54) COFFEE MAKER

(75) Inventor: Yu-Yuan Lin, Tainan (TW)

(73) Assignee: Uni-Splender Corp, Tainan (TW)

( * ) Notice: Subject to any disclaimer, the term of this patent is extended or adjusted under 35 U.S.C. 154(b) by 0 days.

(21) Appl. No.: 11/160,342

(22) Filed: Jun. 20, 2005

(65) Prior Publication Data
US 2006/0283331 A1    Dec. 21, 2006

(51) Int. Cl.
*A47J 31/00*    (2006.01)

(52) U.S. Cl. ........................................ 99/295; 99/323.3

(58) Field of Classification Search .......... 99/295–323, 99/495, 279, 323.3, 284; 222/189.11, 189.06, 222/146.5, 509, 146.2; 426/77–79, 112, 426/115
See application file for complete search history.

(56) References Cited

U.S. PATENT DOCUMENTS

| | | | | |
|---|---|---|---|---|
| 2,205,290 | A | * | 6/1940 | Herrera .................... 99/302 R |
| 3,270,659 | A | * | 9/1966 | Tavera ......................... 99/295 |
| 3,878,772 | A | * | 4/1975 | Nordskog .................... 99/295 |
| 4,995,331 | A | * | 2/1991 | Voit ............................. 118/46 |
| 5,638,741 | A | * | 6/1997 | Cisaria ........................ 99/295 |
| 5,687,636 | A | * | 11/1997 | Diore et al. ................. 99/285 |
| 5,794,519 | A | * | 8/1998 | Fischer ........................ 99/295 |
| 5,957,036 | A | * | 9/1999 | Warner et al. ............... 99/299 |
| 5,964,143 | A | * | 10/1999 | Driscoll et al. .............. 99/299 |
| 6,009,792 | A | * | 1/2000 | Kraan ........................... 99/295 |
| 6,135,173 | A | * | 10/2000 | Lee et al. .................... 141/361 |
| 6,164,191 | A | * | 12/2000 | Liu et al. ..................... 99/305 |
| 6,971,304 | B1 | * | 12/2005 | Lin .............................. 99/295 |
| 6,990,891 | B2 | * | 1/2006 | Tebo, Jr. ...................... 99/295 |
| 7,017,472 | B2 | * | 3/2006 | Grant et al. .................. 99/282 |
| 7,024,983 | B2 | * | 4/2006 | Grant et al. .................. 99/281 |
| 7,093,530 | B2 | * | 8/2006 | Meister et al. ............... 99/295 |
| 7,093,533 | B2 | * | 8/2006 | Tebo et al. ................... 99/315 |

* cited by examiner

*Primary Examiner*—Milton I. Cano
*Assistant Examiner*—Viren Thakur
(74) *Attorney, Agent, or Firm*—Alan Kamrath; Kamrath & Associates PA

(57) ABSTRACT

A coffee maker includes a housing and a brewing assembly. Pushing a handle leftward moves projections along slides in a direction for rising a cylindrical member until being stopped. A funnel-shaped member with a coffee bag placed therein can be slid along the rails toward the housing until being stopped. Pushing the handle rightward moves the projections in an opposite direction for lowering the cylindrical member until being stopped. The coffee bag is pressed by a clamping member and the funnel-shaped member. The coffee maker will supply hot water to an inflow opening such that hot water may then fall through a recess, a mesh element, and a cavity to pass through the coffee bag and proceeds to form coffee extract. The coffee extract may pass an outflow opening and a filter prior to flowing out of the coffee maker.

9 Claims, 7 Drawing Sheets

COFFEE MAKER

BACKGROUND OF THE INVENTION

1. Field of Invention

The present invention relates to coffee makers and, more particularly, to a coffee maker with improved characteristics including the ratio of hot water to coffee to be added being precisely estimated so as to brew the optimum coffee extract.

2. Related Art

Conventionally, a household use coffee maker uses a coffee making process comprising pouring coffee powder into a meshed holder, supplying hot water from a hot water boiler to the holder for brewing coffee, and spouting coffee through an outlet opening.

However, this is unsatisfactory for the purpose for which the invention is concerned for the following reasons: A person cannot precisely estimate the ratio of hot water to coffee powder. Thus, it often happens that the made coffee is either too strong or too weak. Moreover, it is typical for a person to use a spoon to pick up coffee powder prior to pouring same into the holder. Thus, it is also often that coffee powder falls onto another component of the coffee maker, the ground, or the table if sufficient care is not taken. This makes the coffee maker or enviromnent dirty. Thus, the need for improvement still exists.

SUMMARY OF THE INVENTION

It is therefore an object of the present invention to provide a coffee maker for enabling a person to precisely estimate the ratio of hot water to coffee to be added, thereby brewing optimum coffee extract.

It is another object of the present invention to provide a coffee maker preventing coffee to be added from falling onto another place other than the desired location, thereby maintaining a clean environment.

The above and other objects of the present invention are realized by providing a coffee maker including a housing and a brewing assembly. The housing includes a water reservoir, a heating device for heating water in the water reservoir, and a pump. The brewing assembly includes an annular member provided in an upper front side of the housing. A movable cylindrical member is provided under the annular member. An annular rotation member is sleeved on an upper portion of the cylindrical member. A clamping member is elastically coupled to the cylindrical member. A holder with a filter and a funnel-shaped member receiving the holder are combined with the annular member. After a coffee bag is placed in the holder and the rotation member is moved to control the cylindrical member until the clamping member and the holder are axially aligned, the coffee bags can be tightly pressed since a resilient element is provided between the cylindrical member and the clamping member. Hot water is then fed to the brewing assembly for making coffee.

The above and other objects, features and advantages of the present invention will become apparent from the following detailed description taken with the accompanying drawings.

DETAILED DESCRIPTION OF THE INVENTION

Figure 1:
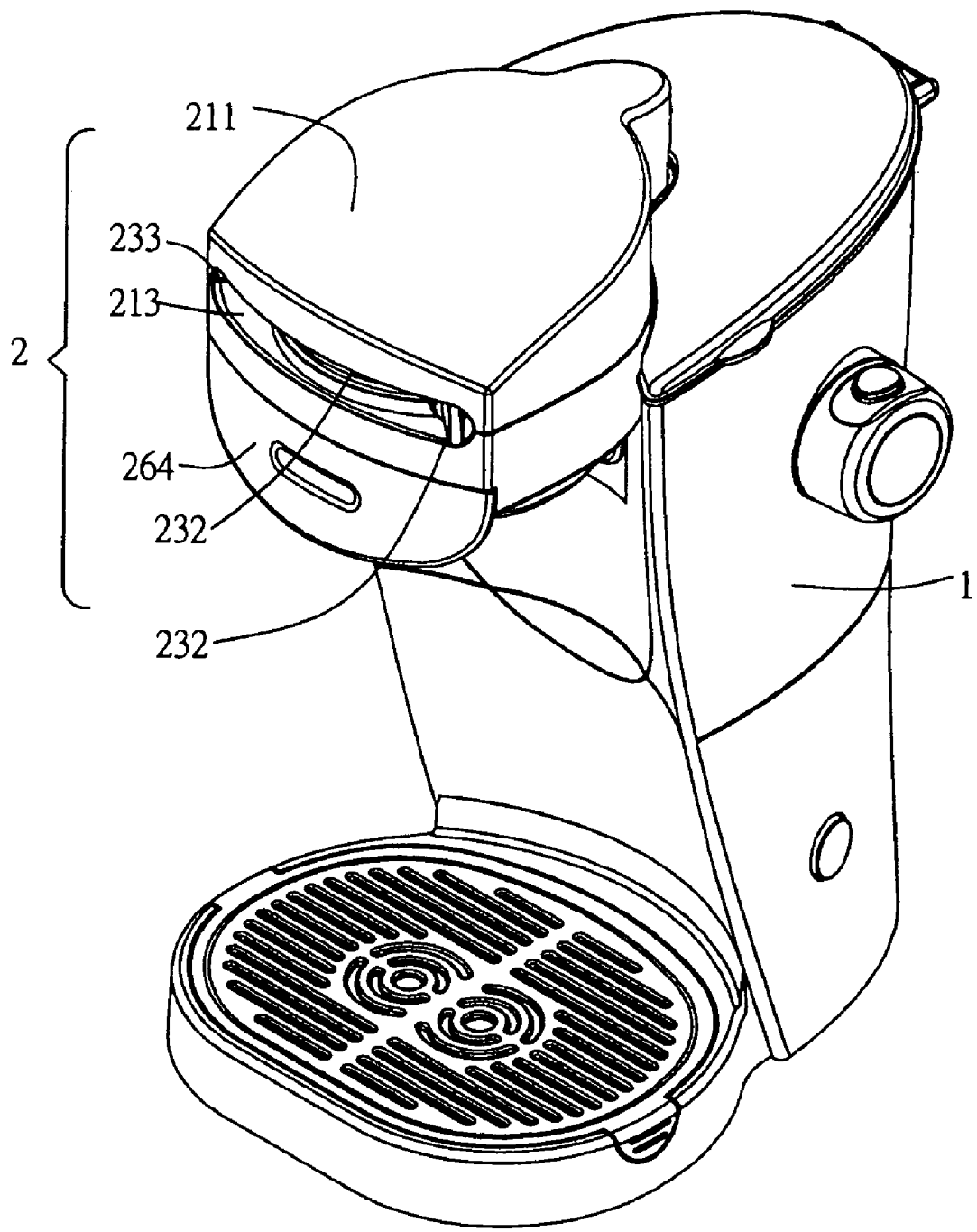
FIG. 1 is a perspective view of a preferred embodiment of a coffee maker according to the invention.

Referring to FIGS. 1 to 8, a coffee maker in accordance with a preferred embodiment of the invention includes a housing 1 and a brewing assembly 2. Housing 1 includes an upper water reservoir 11, a heating device 13 in a lower portion of the water reservoir 11 for heating water, and a pump 12 connected to the water reservoir 11 and the brewing assembly 2 for supplying hot water from the water reservoir 11 to the brewing assembly 2.

Figure 2:
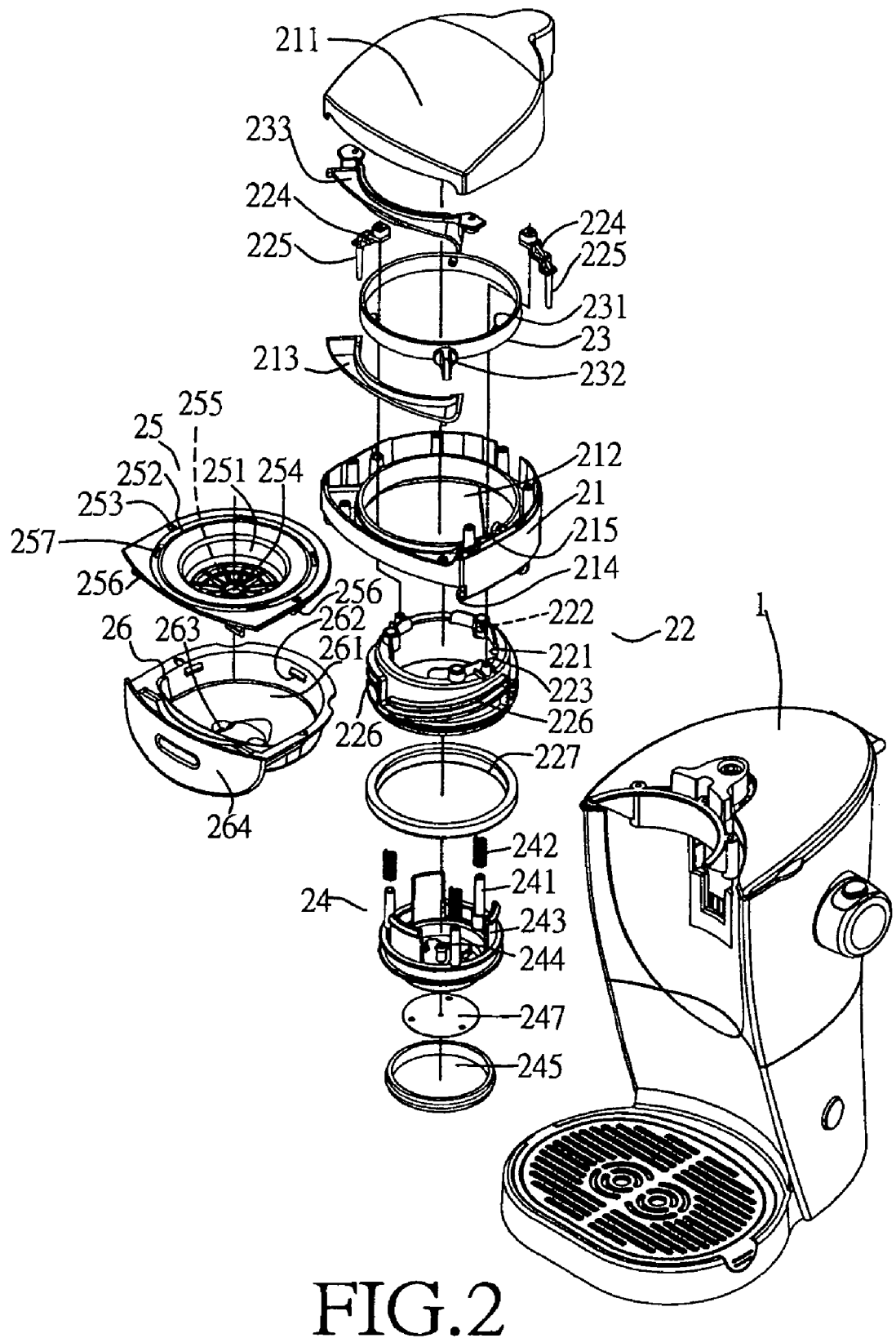
FIG. 2 is an exploded, perspective view of the coffee maker.
Figure 3:
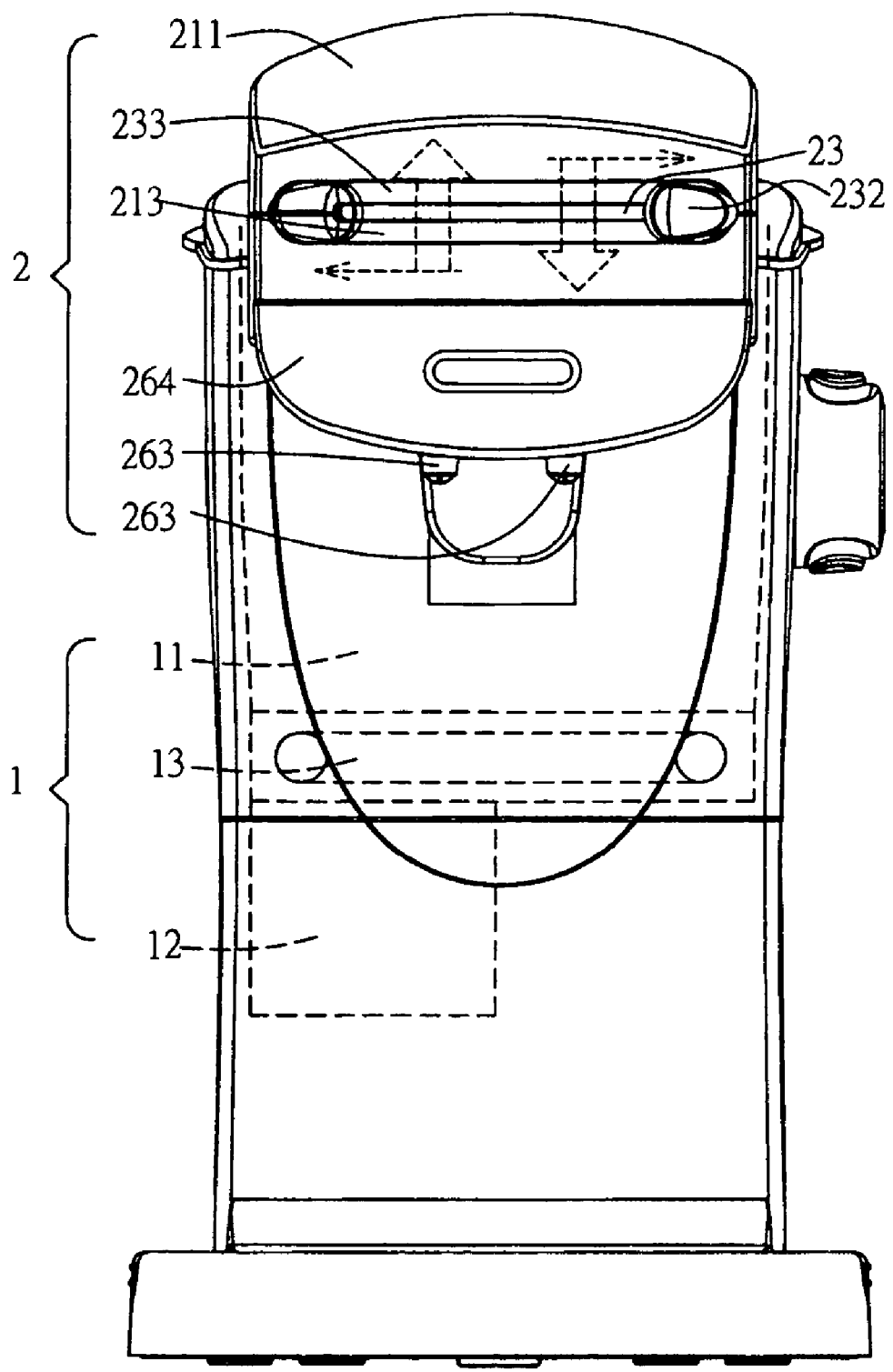
FIG. 3 is a front view of the coffee maker.

The brewing assembly 2 is provided in an upper front side of the housing 1 (see FIG 1). Referring to FIG 2, the brewing assembly 2 comprises the following components. An annular member 21 comprises a separate top cover 211, a central channel 212, a first limiting member 213 set at the front of the annular member, a side bottom rail 214, and a pair of bores 215 at both sides on the top of the annular member adjacent the first limiting member 213. A hollow movable cylindrical member 22 is provided under the annular member 21 and is in communication with the channel 212. The cylindrical member 22 comprises a top riser section 221 having a plurality of holes 222 and a plurality of apertures 223, a plurality of L-shaped positioning members 224 fastened in the apertures 223, a plurality of peripheral curved slides 226, and a water-proof silica gel sealing ring 227 fastened at a lower periphery under the slides 226. The positioning member 224 has a downward bar 225 inserted into the bore 215 for fastening.

An annular rotation member 23 is sleeved on an upper portion of the cylindrical member 22. The annular rotation member 23 includes a plurality of equally spaced projections 231 on its inner surface, with the projections 231 being embedded in the slides 226. A handle 232 is provided on the outer surface of the annular rotation member 23 above the first limiting member 213. A separate upper second limiting member 233 is provided identical to the lower first limiting member 213 and in cooperation therewith. Second limiting member 233 confines the handle 232 and defines a traveling distance of the handle 232 in its leftward or rightward movement (see FIG. 3) such that the cylindrical member 22 may rise or lower in response to the leftward or rightward movement of the handle 232 and a co-action with the projections 231.

A clamping member 24 comprises a plurality of upper posts 241 equally spaced around a top periphery each having a spring 242 put thereon. The posts 241 are inserted into the holes 222 with the tops of the springs 242 being urged against the holes 222 and bottoms of the springs 242 being urged against the body of the clamping member 24. A plurality of walls 243 are equally spaced around the top periphery, with each post 241 disposed between two adjacent walls 243. The walls 243 being engage the riser section 221. A central inflow opening 244 is in fluid communication with the pump 12 through a supply duct (not shown). A water-proof silica gel sealing ring 245 is put on the clamping member 24 and biased by the cylindrical member 22 as leak-proof means. A bottom recess 246 is under the inflow opening 244, and a mesh element 247 is provided at the bottom of the clamping member 24 for equalizing liquid.

A holder 25 includes a central cavity 251 for receiving a coffee bag. An annular element 252 of concave and convex sections is engaged with the bottom of the sealing ring 227. Two sockets 253 on a top periphery with the bars 225 of the positioning member 224 are inserted thereinto. An overflow orifice 257 is provided proximate the annular element 252, and a bottom outflow opening 254 is provided on a center of the cavity 251. A filter 255 is provided on the outflow opening 254, and a plurality of tabs 256 are provided on the bottom of the outflow opening 254.

A funnel-shaped member 26 comprises a bottom outlet opening 263 and a tapered section 261 extended between the outlet opening 263 and an upper peripheral wall. A plurality of holes 262 are on the peripheral wall of the funnel-shaped member 26 with the tabs 256 fastened therein by snapping. A front tongue 264 enables a user to pull or push the funnel-shaped member 26.

Figure 4:
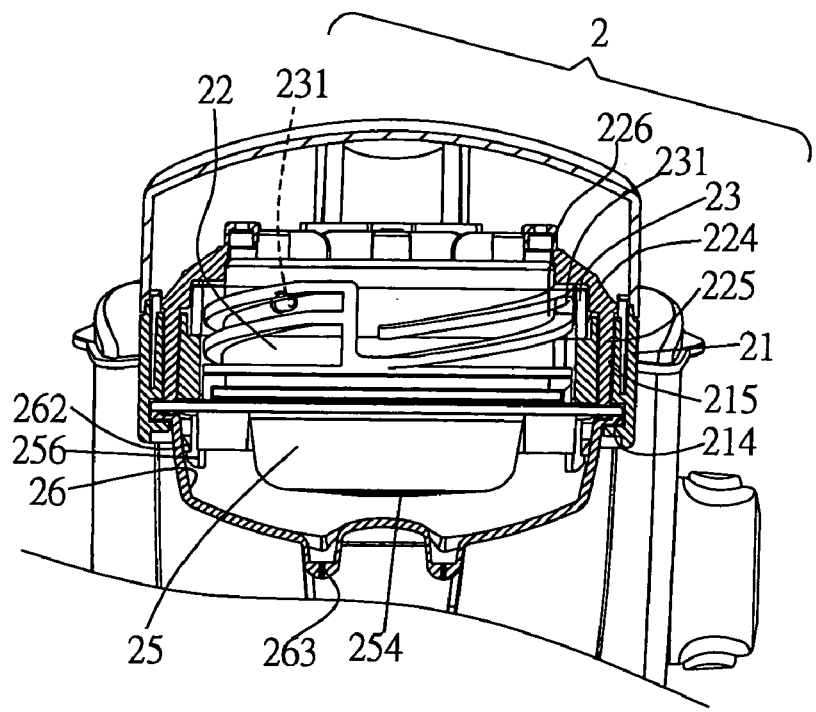
FIG. 4 is a sectional view of an upper portion of FIG. 3.
Figure 5:
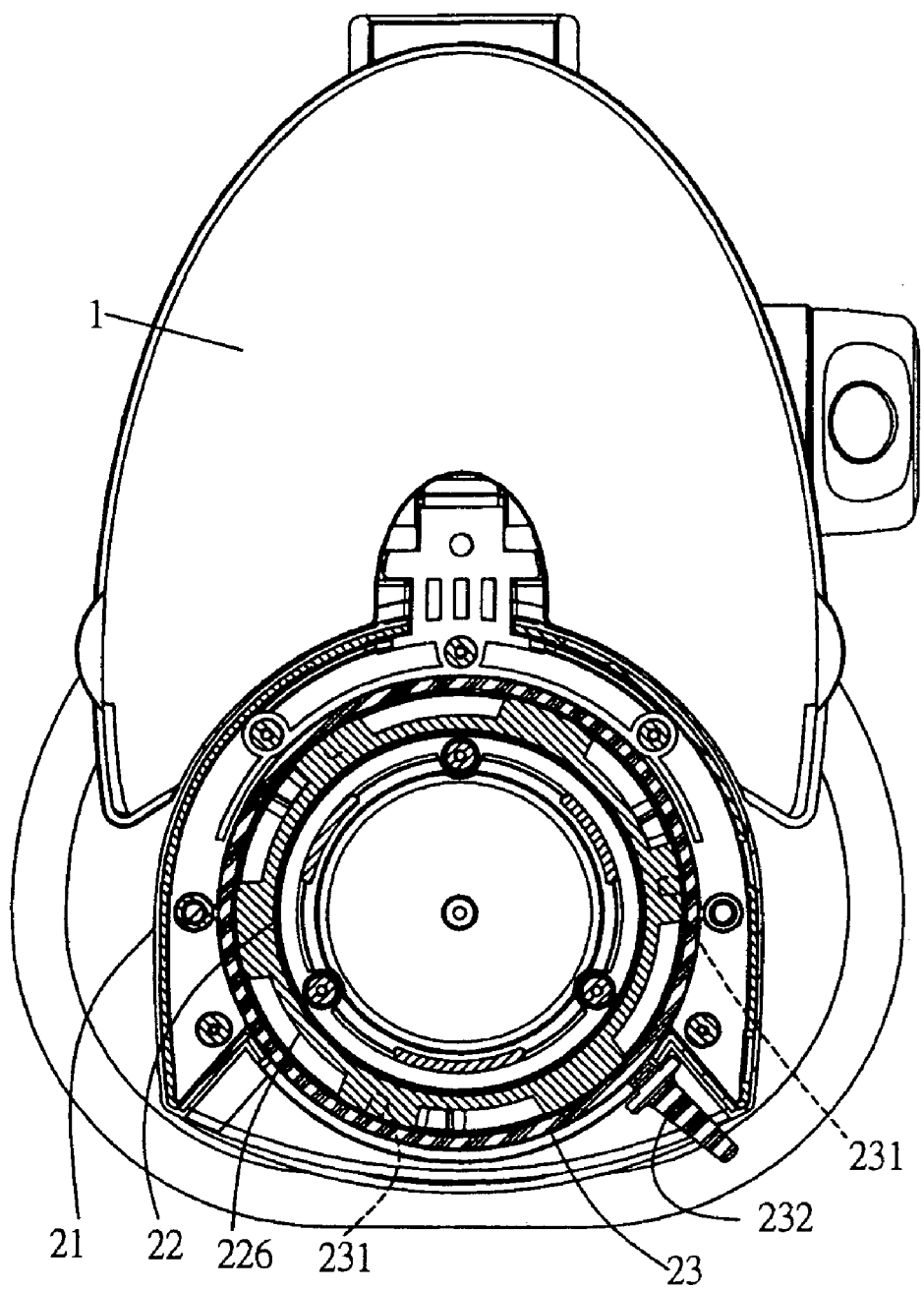
FIG. 5 is a top view in part section of the coffee maker.
Figure 6:
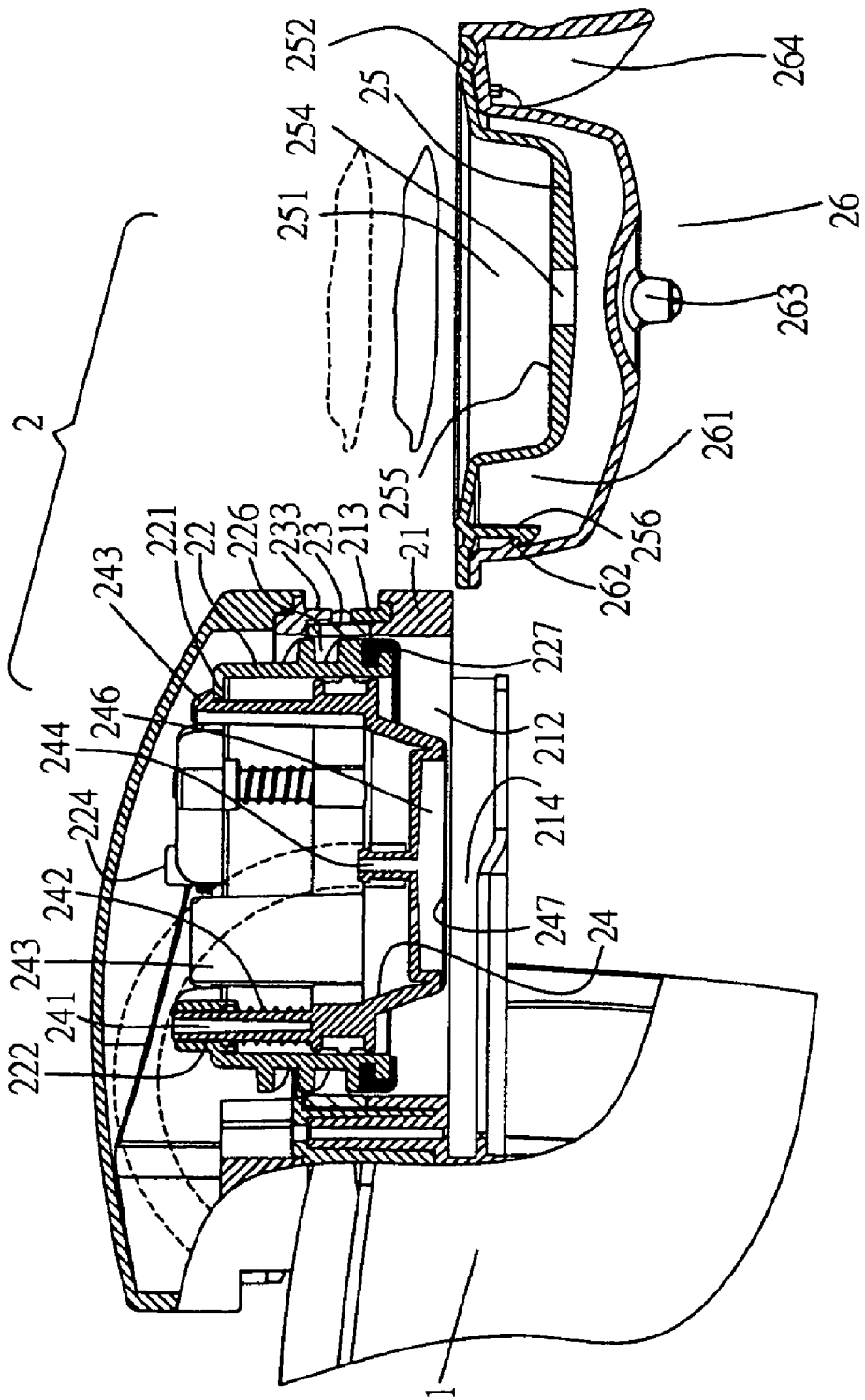
FIG. 6 is a sectional view showing a process of placing a coffee bag in a holder.

Assembly of the coffee maker will be described in detail detailed below. As shown in FIGS. 4 to 6, the annular member 21 is mounted on the upper front side of the housing 1. The cylindrical member 22 is mounted in the central channel 212. The annular rotation member 23 is put on the slides 226: with the projections 231 embedded in the slides 226 and the handle 232 disposed between two ends of the first limiting member 213. The second limiting member 233 is placed on top of the first limiting member 213 for cooperating therewith so as to confine the handle 232 therebetween. The bars 225 of the positioning members 224 are inserted into the bores 215. The clamping member 24 is mounted in the cylindrical member 22 with the spring loaded posts 241 being inserted into the holes 222. with the springs 242 biased between the cylindrical member 22 and the clamping member 24 and the walls 243 engaged with the top riser section 221. The tabs 256 are inserted into the holes 262 for securing the holder 25 to the funnel-shaped member 26. Finally, the funnel-shaped member 26 is slid along the rails 214 until put in place.

The coffee making operation of the invention will be described in detail below. As shown in FIGS. 3 and 6 to 8, the handle 232 is pushed leftward to move the projections 231 along the slides 226 in one direction until the lower limit of the projections 231 is reached with the cylindrical member 22 rising. Next, the front tongue 264 is pulled outwardly to remove the funnel-shaped member 26. Then, a coffee bag is placed in the central cavity 251. Next, the funnel-shaped member 26 is slid along the rails 214 until the clamping member 24 and the holder 25 are axially aligned. Last, the handle 232 is pushed rightward to move the projections 231 along the slides 226 in an opposite direction until the upper limit of the projections 231 is reached with the cylindrical member 22 lowering, with the coffee bag being pressed by the clamping member 24. Note that either one or two coffee bags can be tightly pressed since a resilient element is provided between the cylindrical member 22 and the clamping member 24. Also, the bars 225 are inserted into the sockets 253 when the handle 232 is pushed rightward preventing the funnel-shaped member 26 from being pulled out of the coffee maker accidentally.

Figure 7:
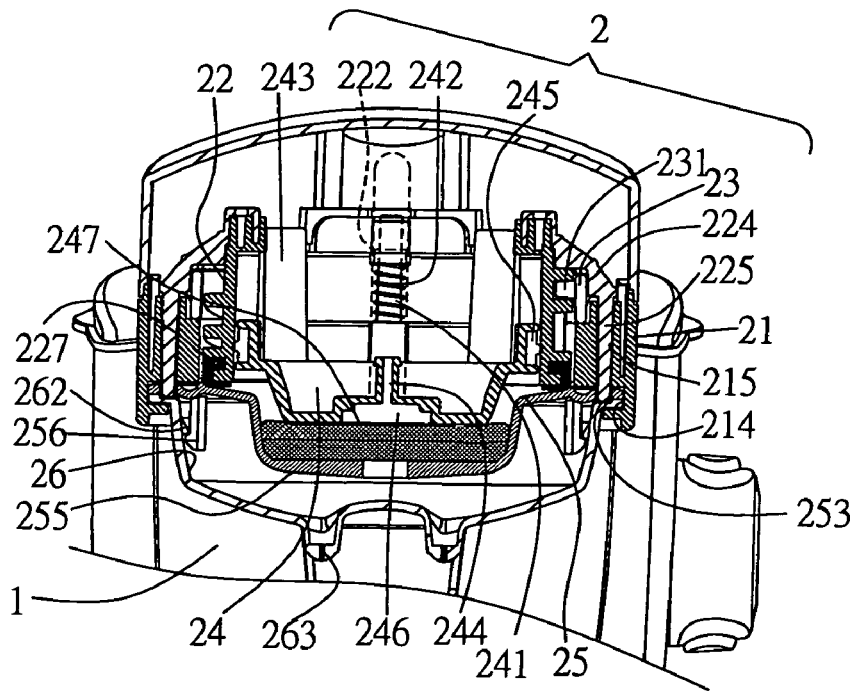
FIG. 7 is a view similar to FIG. 4 where the coffee bag has been placed in the holder.
Figure 8:
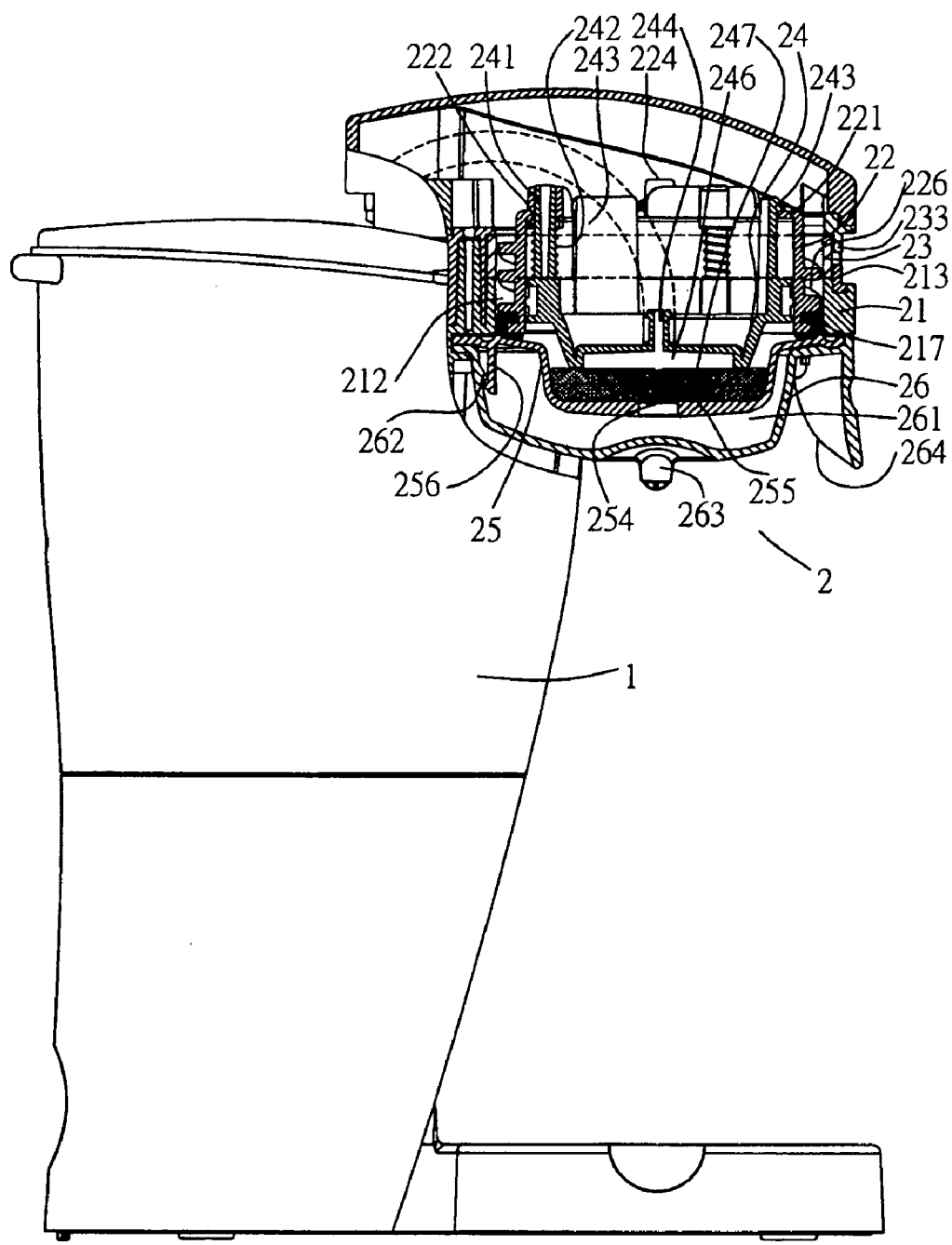
FIG. 8 is a side view in part section of the coffee maker where the brewing assembly with the placed coffee bag is shown in section.

As shown in FIGS. 7 and 8, hot water is fed from the pump 12 to the inflow opening 244 in response to activating the coffee maker. Hot water then falls in the recess 246. Also, the mesh element 247 below the recess 246 is adapted to uniformly distribute hot water passing through. Hot water then enters the cavity 251 to pass through the coffee bag and proceeds to form coffee extract which is further filtered by the mesh of the filter 255 after passing the outflow opening 254. Finally, the coffee extract flows out of the coffee maker via the outlet opening 263.

While the invention herein disclosed has been described by means of specific embodiments, numerous modifications and variations could be made thereto by those skilled in the art without departing from the scope and spirit of the invention set forth in the claims.

What is claimed is:

1. A coffee maker comprising:
   a housing including a water reservoir, a heating device for heating water in the water reservoir, and a pump; and
   a brewing assembly comprising:
   an annular member in an upper front side of the housing and including a hingedly connected cover, a central channel, a side bottom rail, and a pair of bores at both sides;
   a movable cylindrical member under the annular member and including a top riser section having a plurality of first holes and a plurality of apertures, a plurality of L-shaped positioning members fastened in the plurality of apertures and each having a downward bar inserted through one of the pair of bores of the annular member, and a plurality of peripheral curved slides;
   an annular rotation member sleeved on an upper portion of the movable cylindrical member and including a plurality of equally spaced projections on an inner surface, the projections being adapted to be embedded in the plurality of peripheral curved slides, and a handle provided on an outer surface, the handle being moved leftwardly or rightwardly to rise or lower the movable cylindrical member by the co-action of the plurality of projections and the plurality of peripheral curved slides;
   a clamping member including a plurality of upper posts equally spaced around a top periphery with springs put thereon, the upper posts being inserted into the plurality of first holes, a plurality of walls equally spaced around the top periphery with each post disposed between two adjacent walls, the walls being engaged with the top riser section, and a central inflow opening in fluid communication with the pump;
   a holder including a central cavity, an overflow orifice proximate the annular member for receiving coffee bags and a bottom outflow opening on a center of the central cavity; and
   a funnel-shaped member adapted to slide along the bottom rail for positioning and including a bottom outlet opening and a front tongue.

2. A coffee maker of claim 1, wherein the annular member comprises a front first limiting member, and the annular rotation member comprises a second limiting member disposed above the first limiting member for smoothing the movement of the annular rotation member.

3. A coffee maker of claim 1, wherein the movable cylindrical member comprises a first water-proof silica gel sealing ring for preventing leaking between the movable cylindrical member and the annular member.

4. A coffee maker of claim 1, wherein the clamping member comprises a second water-proof silica gel sealing ring for preventing leaking between the clamping member and the movable cylindrical member.

5. A coffee maker of claim 1, wherein the clamping member comprises a bottom recess under the inflow opening and a bottom mesh element under the recess for uniformly distributing water.

6. A coffee maker of claim 1, wherein the holder comprises an annular element of concave and convex sections on a top engaged with a bottom of the movable cylindrical member.

7. A coffee maker of claim 1, wherein the holder comprises sockets on a top periphery with the bars of the positioning members being inserted thereinto.

8. A coffee maker of claim 1, wherein the holder comprises a filter on the outflow opening for filtering coffee extract.

9. A coffee maker of claim 1, wherein the holder comprises a plurality of tabs on a bottom of the outflow opening, and the funnel-shaped member comprises a plurality of second holes on an upper peripheral wall, with the tabs fastened therein for fastening the holder and funnel-shaped member.

* * * * *